(12) United States Patent
Simkins

(10) Patent No.: US 8,220,060 B1
(45) Date of Patent: Jul. 10, 2012

(54) METHOD AND SYSTEM FOR MAINTAINING THE SECURITY OF DESIGN INFORMATION

(75) Inventor: James M. Simkins, Park City, UT (US)

(73) Assignee: Xilinx, Inc., San Jose, CA (US)

( * ) Notice: Subject to any disclaimer, the term of this patent is extended or adjusted under 35 U.S.C. 154(b) by 212 days.

(21) Appl. No.: 12/763,465

(22) Filed: Apr. 20, 2010

Related U.S. Application Data

(63) Continuation of application No. 10/929,078, filed on Aug. 27, 2004, now Pat. No. 7,757,294.

(51) Int. Cl.
*G06F 17/50* (2006.01)

(52) U.S. Cl. ........... 726/26; 716/116; 716/117; 713/176

(58) Field of Classification Search ............... 726/26; 713/176; 716/116, 117; 326/39
See application file for complete search history.

(56) References Cited

U.S. PATENT DOCUMENTS

| | | | |
|---|---|---|---|
| 5,457,408 A | 10/1995 | Leung | |
| 5,657,390 A | 8/1997 | Elgamal et al. | |
| 5,768,372 A | 6/1998 | Sung et al. | |
| 5,915,017 A | 6/1999 | Sung et al. | |
| 5,978,476 A | 11/1999 | Redman et al. | |
| 6,161,211 A * | 12/2000 | Southgate | 716/102 |
| 6,212,639 B1 | 4/2001 | Erickson et al. | |
| 6,275,491 B1 * | 8/2001 | Prasad et al. | 370/389 |
| 6,356,637 B1 | 3/2002 | Garnett | |
| 6,366,117 B1 | 4/2002 | Pang et al. | |
| 6,401,208 B2 | 6/2002 | Davis et al. | |
| 6,441,641 B1 | 8/2002 | Pang et al. | |
| 6,510,548 B1 | 1/2003 | Squires | |
| 6,654,889 B1 | 11/2003 | Trimberger | |
| 6,748,368 B1 | 6/2004 | Trimberger et al. | |
| 6,834,347 B2 * | 12/2004 | Goodman et al. | 713/191 |
| 6,842,454 B2 * | 1/2005 | Metcalf, III | 370/392 |
| 6,931,543 B1 | 8/2005 | Pang et al. | |
| 6,957,340 B1 | 10/2005 | Pang et al. | |
| 6,965,675 B1 | 11/2005 | Trimberger et al. | |

(Continued)

FOREIGN PATENT DOCUMENTS
WO    WO 01/08411 A1    2/2001

OTHER PUBLICATIONS
U.S. Appl. No. 10/147,664, filed May 17, 2002, Trimberger.

(Continued)

*Primary Examiner* — Kim Vu
*Assistant Examiner* — Thomas Gyorfi
(74) *Attorney, Agent, or Firm* — Samuel G. Campbell, III; LeRoy D. Maunu

(57) ABSTRACT

Approaches for protecting design information are disclosed. In one approach, a request for an IP core from an integrated circuit device is received, and the request includes identification information. An identifier range is determined from the identification information. The identifier range includes a plurality of unique device identifiers identifying a plurality of integrated circuit devices that are allowed to receive the IP core. The identifier range is downloaded to the integrated circuit device, which evaluates whether or not a unique device identifier that is stored on the integrated circuit device is within the downloaded identifier range. The IP core is programmed into the integrated circuit in response to the unique device identifier that is stored on the integrated circuit device being within the downloaded identifier range.

19 Claims, 10 Drawing Sheets

U.S. PATENT DOCUMENTS

| | | | |
|---|---|---|---|
| 6,981,153 | B1 | 12/2005 | Pang et al. |
| 6,996,713 | B1 | 2/2006 | Trimberger |
| 7,058,177 | B1 | 6/2006 | Trimberger et al. |
| 7,107,567 | B1 | 9/2006 | LeBlanc |
| 7,117,372 | B1 | 10/2006 | Trimberger et al. |
| 7,117,373 | B1 | 10/2006 | Trimberger et al. |
| 7,134,025 | B1 | 11/2006 | Trimberger |
| 7,162,644 | B1 | 1/2007 | Trimberger |
| 7,165,229 | B1 | 1/2007 | Gathoo et al. |
| 7,200,235 | B1 | 4/2007 | Trimberger |
| 7,219,237 | B1 | 5/2007 | Trimberger |
| 7,240,218 | B2 | 7/2007 | Kean |
| 7,321,971 | B2 | 1/2008 | Wilding et al. |
| 7,366,306 | B1 | 4/2008 | Trimberger |
| 7,373,668 | B1 | 5/2008 | Trimberger |
| 7,389,429 | B1 | 6/2008 | Trimberger |
| 7,653,820 | B1 | 1/2010 | Trimberger |
| 7,725,558 | B2 * | 5/2010 | Dickenson .................... 709/215 |
| 2001/0037458 | A1 | 11/2001 | Kean |
| 2002/0150252 | A1 | 10/2002 | Wong |
| 2002/0199110 | A1 | 12/2002 | Kean |
| 2003/0187805 | A1 | 10/2003 | Shen |

OTHER PUBLICATIONS

U.S. Appl. No. 10/150,289, filed May 17, 2002, Trimberger.

U.S. Appl. No. 11/077,052, filed Mar. 10, 2005, Donlin et al.

U.S. Appl. No. 11/076,656, filed Mar. 10, 2005, Donlin et al.

U.S. Appl. No. 10/929,078, filed Aug. 27, 2004, Simkins.

Actel Corp., *Protecting your Intellectual Property from the Pirates*, presentation at DesignCon '98, Jan. 26, 1998, 18 pp, Santa Clara, California, USA.

Altera Corp., *Evaluating AMPP & MegaCore Functions*, Application Note 125, Apr. 2001, Ver. 2.0, pp. 1-9, available from Altera Corporation, San Jose, California, USA.

Dalpasso, Marcello et al., "Hardware/Software IP protection," *Proceedings of the $37^{th}$ Annual Conference on Design Automation (DAC'00)*, Jun. 5-9, 2000, pp. 593-596, Los Angeles, California, USA.

Kean, Tom, "Cryptographic Rights Management of FPGA Intellectual Property Cores" *Proc. of the 2002 ACM/SIGDA $10^{th}$ International Symposium on Field Programmable Gate Arrays*, Feb. 24, 2002, pp. 113-118, ACM, New York, New York, USA.

Patavalis, Nick, *A Brief Introduction to the JTAG Boundary Scan Interface*, Nov. 8, 2001, 7 pages, available from InAccess Networks, Athens, Greece.

Schneier, Bruce, *Applied Cryptography, $2^{nd}$ Edition*, published by John Wiley & Sons, 1996, pp. 32-37, 111 River St., Hoboken, New Jersey, USA.

U.S. Dept. of Commerce, *Digital Signature Standard (DSS)*, Federal Information Processing Standards Publn. 186-2, Jan. 27, 2000, pp. 1-74, U.S. Department of Commerce, National Institute of Standards and Technology, Gaithersburg, Maryland, USA.

Wikipedia, "Programmable logic device," article downloaded from http://en.wikipedia.org on Jul. 25, 2008, article edit date Aug. 15, 2004, 6 pp.

Xess Corp., *XSTOOLS V4.0 User Manual*, Oct. 29, 2001, 18 pages, available from XESS Corporation, Apex, North Carolina, USA.

* cited by examiner

METHOD AND SYSTEM FOR MAINTAINING THE SECURITY OF DESIGN INFORMATION

TECHNICAL FIELD

The present invention relates to the field of programmable logic devices, and more particularly relates to a method and system for maintaining the security of design information (e.g., an IP core).

BACKGROUND

IP vendors (vendors of intellectual property (IP) cores) and other source of design information currently focus their development efforts on designs for the application-specific integrated circuit (ASIC) market. This is due, in large part, to the simple, reliable methods that are presently available to determine revenues. These methods allow an IP vendor to determine per-chip IP royalties on the ASICs manufactured using their designs.

IP vendors do not tailor their IP cores for use in programmable logic devices (PLDs) such as Field Programmable Gate Arrays (FPGAs) or Complex Programmable Logic Devices (CPLDs), because there is presently no method to identify (and/or restrict) which PLDs are allowed to incorporate the vendor's IP core(s). As a result, IP vendors lack the motivation necessary to optimize their designs for a given PLD architecture. ASIC-centric IP cores therefore typically perform poorly in a PLD, which further reinforces the need for designers and manufacturers to migrate to an ASIC-based approach quickly after initial prototype testing using PLDs.

What is therefore desired is a technique that provides a per-chip royalty method for third-party IP cores that can be used in a PLD such as an FPGA. Such a technique should prevent access to/use of the subject IP cores by unauthorized parties, and provide a significant cost-performance enhancement for PLD-based systems by allowing per-chip royalties to be determined, in a simple, convenient manner. Moreover, such a technique should provide IP vendors an incentive to optimize for a given PLD architecture by providing the foregoing features in a transparent, controllable, and economic mechanism. Such techniques should also allow for the ready identification of PLDs employing the technique.

SUMMARY

Embodiments of the present invention addresses the foregoing infirmities by facilitating the provision of IP cores to an entity configuring (i.e., programming) a PLD (or even directly to the PLD itself), in a manner that does not permit access to the IP core's design information. Only the PLD receiving the IP core is able to access the IP core's design information, and thus program the IP core into the PLD. By making the IP core available only within the PLD itself, other entities (manufacturers, end-users and the like) are denied access to the IP core's design, and so prevented from co-opting the design for their own purposes. This allows IP core vendors to make their IP cores available without the fear of losing their investment in the now-protected IP cores, and provides the many benefits of the present invention discussed subsequently.

In one embodiment of the present invention, a method is disclosed. The method includes generating an encrypted IP core by encrypting an IP core using a public key, downloading the encrypted IP core to a programmable logic device (PLD), and recovering the IP core by decrypting the encrypted IP core using a private key. The private key is associated with the PLD, and the public key and the private key correspond to one another.

In another embodiment of the present invention, a method is disclosed. The method includes receiving authorization information corresponding to an IP core and comparing local authorization information and the authorization information. The authorization information is received at a PLD, and the local authorization information is stored at the PLD.

In yet another embodiment of the present invention, a PLD is disclosed. Such a PLD includes a configuration unit and a PLD fabric. The configuration unit is configured to recover an IP core by decrypting an encrypted IP core using a private key of the PLD, the encrypted IP core having been generating by encrypting the IP core using a public key of the PLD. The private key is associated with the PLD. The configuration unit is coupled to program the IP core into the PLD fabric.

The foregoing is a summary and thus contains, by necessity, simplifications, generalizations and omissions of detail; consequently, those skilled in the art will appreciate that the summary is illustrative only and is not intended to be in any way limiting. As will also be apparent to one skilled in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

The use of the same reference symbols in different drawings indicates similar or identical items.

DETAILED DESCRIPTION

Figure 1:
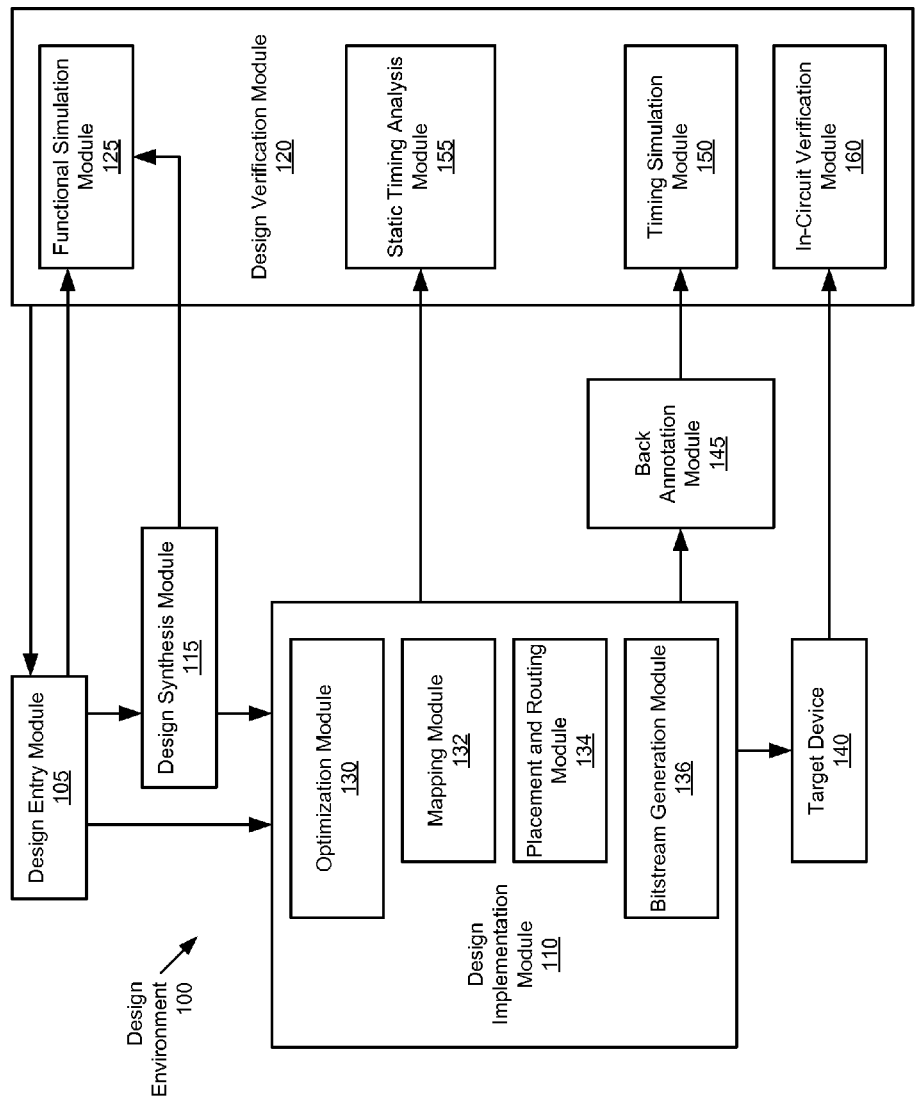
FIG. 1 is a block diagram illustrating a design flow for a programmable logic device.

The following sets forth a detailed description of at least the best contemplated mode for carrying out the one or more devices and/or processes described herein. The description is intended to be illustrative and should not be taken to be limiting.

INTRODUCTION

The present invention provides a mechanism that facilitates the provision of IP cores to an entity configuring (i.e., programming) a PLD (or even directly to the PLD itself), in a manner that does not permit access to the IP core's design information. Only the PLD receiving the IP core is able to access the IP core's design information, and thus program the IP core into the PLD. By making the IP core available only within the PLD itself, other entities (manufacturers, end-users and the like) are denied access to the IP core's design, and so prevented from co-opting the design for their own purposes.

In one embodiment, this protection is provided through the use of a public/private key encryption technique. The IP vendor encrypts the IP core using the public key of the recipient PLD (or that of the PLD family or other such grouping). The PLD receiving the encrypted IP core then decrypts the encrypted IP core using the private key of the PLD (or that of the PLD's family). The PLD is then able to program the decrypted IP core into the PLD's fabric.

Moreover, such an approach allows for the implementation of per-chip royalties (e.g., in the manner of ASICs), as well as providing a mechanism to uniquely identify the PLDs implementing designs employing such IP cores. The present invention provides such a method and system, one which is capable of securely delivering an IP core to a PLD (e.g., an FPGA), as well as restricting the use of the IP core to only those devices that are authorized to employ that IP core, through the use of a unique identifier. This unique identifier can also be used to prevent the PLD from being used or sold surreptitiously, by allowing for the device's ready identification. The combination of per-chip royalties and the security provided by the present invention will foster investment in the design and optimization of IP cores by their designers. This will lead to greater investment in IP core design, and so better-performing IP cores, as a result.

In one embodiment, the combination of a public/private key for each PLD (or PLD family member), and a unique device identification number for each part manufactured (individually, within the PLD family or by some other grouping of PLDs) provides an approach for implementing secure per-chip IP core royalties. Further, the implementation of a two-level protection scheme in such a system provides security of third-party intellectual property (IP) such as that of an IP vendor, in addition to per-chip FPGA royalties. Using such an embodiment, an IP vendor encrypts their IP core using the device's (or device family's) public key.

Also embedded in the IP core is a set of one or more unique PLD identifiers that, as will be appreciated, uniquely identify the PLD (e.g., singly, within a PLD family or in some other manner) that are permitted to employ the IP core. This allows the unique identification of PLDs for which the end-user has obtained rights (e.g., from the third party). A configuration controller of the PLD decrypts the IP core if the range/set of PLD identifiers includes that of the PLD in question. Otherwise, the IP core is not decrypted, and so cannot be inserted ("stitched") into the skeleton design being programmed into the PLD.

Using the present invention, an IP vendor is free to send an encrypted IP core to designers, manufacturers, end-users and the like, without concern for the IP core being subjected to reverse engineering. Such parties are unable to view the IP core's design because the private key pair for the public key is hard-coded inside the PLD (individually, by family or in some other fashion), and such parties have no access thereto, for all practical purposes. Design tools implementing the present invention block users from "seeing" inside the PLD design components associated with the IP core. The IP core's design thus remains protected, even from those who have purchased its use.

Given that the IP vendor is allowed to identify a range (or set or some other grouping) of unique device identifiers that identify PLDs which are allowed to receive a given IP core, a single encrypted IP core can support a large set of devices in a production environment. The public key is published, and so available to vendors for use in encrypting their IP cores. In one embodiment, the number of public keys to be maintained is reduced by using one public key for each PLD family (rather than on a per-unit basis, for example). Each PLD then has its own unique PLD identifier within the PLD family, which can be marked on the PLD's physical package, for example. Assignment of a public key can also be further differentiated based on PLD family, speed grade, and package, among other possible criteria. This ensures that the IP core requested is used in a PLD that meets the IP core's performance requirements.

The embodiments of the present invention provide a number of advantages. These embodiments provide efficient, convenient and architecture-independent techniques for securely providing IP cores to a PLD, and for uniquely identifying that PLD. In the former case, an IP vendor's IP core can be securely provided to an end-user, and in so doing, provide the ability to implement a per-chip royalty by allowing the identification of those PLDs authorized to receive a given IP core, those PLDs having actually received the IP core, or by some comparable metric. In the latter case, protection from the sale of PLDs on the "grey market" is also prevented by uniquely identifying each such device.

With regard to securing an IP core, encryption is employed in conjunction with a unique PLD identifier (which can simply be a PLD identifier, a PLD identifier/PLD family identifier combination, or the like). In a scenario in which a public/private key technique is employed, an IP core is encrypted with a public key by the IP vendor. The public key corresponds in some manner to the PLD requesting the IP core. A PLD implementing an embodiment of the present invention includes a configuration controller that is capable of decrypting the encrypted IP core with its private key.

In one embodiment, the encrypted IP core contains a range of PLD identifiers for which the IP core is authorized. If the IP core contains a PLD identifier that is within the range indicated in the IP core, then the configuration controller loads the IP core; otherwise, the configuration fails. This approach enables third-party IP core providers to have a secure mechanism for a per-chip royalty revenue stream. As such, third-party IP vendors thus have an incentive to optimize their IP cores for PLDs and so create deterministic, guaranteed performance that is similar to the ASIC model of reuse.

A PLD identifier can also be implemented such that the PLD identifier includes information identifying the PLD in a manner that ensures that the PLD is not used for generic (i.e., unauthorized) bitstreams. This is important to prevent the misuse of such PLDs. Currently, many PLDs can be programmed using configuration bitstreams other than those configuration bitstreams that have been qualified (tested and authorized) in the given PLD type. This allows an end-user to implement a design in a surreptitious manner, allowing the end-user to obtain a significantly lower-cost part, if the end-user is willing to perform their own characterization with regard to non-qualified configuration bitstreams. Expanding the PLD identifier to include an identification field that provides protection against these devices ever being resold illegally on the grey market is thus desirable. In preventing such sales (by way of the PLD's "identity" being known), end-users are prevented from avoiding their responsibilities with regard to royalties due the vendor of a given IP core.

Even if the PLD identifier is not known (e.g., marked on the package), the PLD manufacturer can employ a technique that allows the PLD manufacturer to use its own encryption method, in order to ensure that the configuration bitstream programmed into the PLD is authorized. In such a scenario, methods other than public/private key encryption can be employed. For example, the PLD identifier can also correspond to another key (e.g., a symmetric key, another private key or the like), which can then be used for such access and analysis.

In another aspect of the present invention multiple public/private key pairs are associated with a set of PLDs (the set having one or more elements). Some of the public keys of the multiple public/private key pairs are restricted access public keys, i.e., given only to selected users, while the remainder of the public keys of the multiple public/private key pairs are unrestricted access public keys, i.e., accessible by the general public. Hence for the unrestricted access public key or keys, any IP core vendor can encrypt their design using one of the set of unrestricted access public keys for use on those PLDs that have the corresponding set of private keys. The set of restricted public keys is hidden from the general user and may be used by a privileged or special user to download, e.g., maintenance, update, or repair configuration (bitstream) information, into the PLDs with the associated set of private keys.

Thus one embodiment of the present invention includes an integrated circuit (IC), having programmable logic, for receiving configuration information for programming the programmable logic The IC includes: a plurality of public/private key pairs, where the private keys of the plurality of public/private key pairs are stored on the IC; a first public key of the plurality of public/private key pairs used for encrypting first configuration information, where the first public key has unrestricted access, e.g., general public access; a decryption circuit, either dedicated hardware or configured in the programmable logic of a PLD, for decrypting the encrypted first configuration information using a first private key of the plurality of public/private key pairs associated with the first public key; and a second public key of the plurality of public/private key pairs used for encrypting second configuration information, e.g., partial reconfiguration information, where the second public key has restricted access.

Other advantages of embodiments of the present invention include the ability of a PLD manufacturer to support secure IP cores without having to act as a "middleman" in any of the per-chip royalty transactions, or in the distribution of the IP cores secured using the present invention. Advantageously, then, such interactions take place entirely between the third-party vendor, and the designer, manufacturer, end-user or the like. The PLD identifier can include stepping information, speed grade information and the like, to ensure proper/acceptable performance of the IP core. The PLD identifier can also include information on bad rows and columns for use in sparing. These advantages and others will be better understood in light of the following discussions.

An Example Design Environment

FIG. 1 is block diagram of a design environment 100 that is capable of employing the present invention. Design environment 100 includes a design entry module 105, which allows a designer to enter a design into design environment 100. A design entered using design entry module 105 is then taken as input by a design implementation module 110.

Additionally, one or more portions of the design entered using design entry module 105 can be synthesized using a design synthesis module 115. Once synthesized, these portions can be provided to a design verification module 120, and in particular, a functional simulation module 125, thereof. The synthesized portions of the design generated by design synthesis module 115 are also provided to design implementation module 110. Typically, this occurs after the synthesized portions of the design have been simulated using functional simulation module 125. Other portions of the design entered via design entry module 105 are also provided to functional simulation module 125 of design verification module 120. By providing the design to functional simulation module 125 (both the portions entered by the designer using design entry module 105, and the portions of that design synthesized by design synthesis module 115), a complete functional simulation of the design can be performed.

Once the design (both designer-entered and synthesized portions of the design) have been provided to design implementation module 110, a number of processes are then performed on the design in order to prepare the design for being programmed into a target device. Among these are optimization (performed by optimization module 130), mapping (performed by a mapping module 132), placement and routing (performed by a placement and routing module 134), and bitstream generation (performed by a bitstream generation module 136).

The optimization performed by optimization module 130 can include, for example, two-level and multi-level optimization, as well as device-specific logic packing. The objective of such optimization is to decrease the area required by the combinational logic, to reduce the number of logic levels, or both. The mapping performed by mapping module 132 maps the components of the design into elements that exist within the target device in which the design is to be implemented.

Once optimization and mapping (via the selection of elements within the target device) have been performed, placement of the identified elements within the target device is performed by placement and routing module 134, as is the routing of connections between those elements. The placement operations performed can be equated to the selection of which elements within the target device will be used to perform a given function. Once the requisite elements of the target device are identified and placed, and the routing of connections between these elements has been determined, a bitstream can be generated. This bitstream represents the programming of the target device that is needed to provide such elements and connections. Such a bitstream is generated by bitstream generation module 136. This bitstream is then downloaded by design implementation module 110 to the target device (represented in FIG. 1 as a target device 140).

Design implementation module 110 also can provide for back annotation by providing place and route information to a back annotation module 145, which in turn provides information regarding the design to a timing simulation module 150. Design implementation module 110 can also provide information to a static timing analysis module 155. By allowing the performance of static timing analysis (via static timing analysis module 155) and dynamic timing analysis (provided by timing simulation module 150), as well as information regarding the design generated by functional simulation module 125, design verification module 120 is able to feedback information to design entry module 105 in order to allow defects in the design to be corrected.

This process of implementing a design using design implementation module 110 and feedback to design verification module 120 also allows a design to be optimized in an iterative manner. Once a design has been optimized in this manner, the design can then be downloaded to target device 140, as noted. Once downloaded to target device 140, in-circuit verification can be performed using an in-circuit verification 160 of design verification module 120. As before, the information generated by in-circuit verification module 160 can be fed back from design verification module 120 to design entry module 105, in order to optimize the design.

Regarding the signals and communications described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above-described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of FPGA 100). It is to be understood that such depicted architectures are merely examples, and that in fact many other architectures can be implemented that achieve the same functionality. Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "[operably] connected", or "[operably] coupled", to each other to achieve the desired functionality.

An Example Secure Framework

Figure 2:
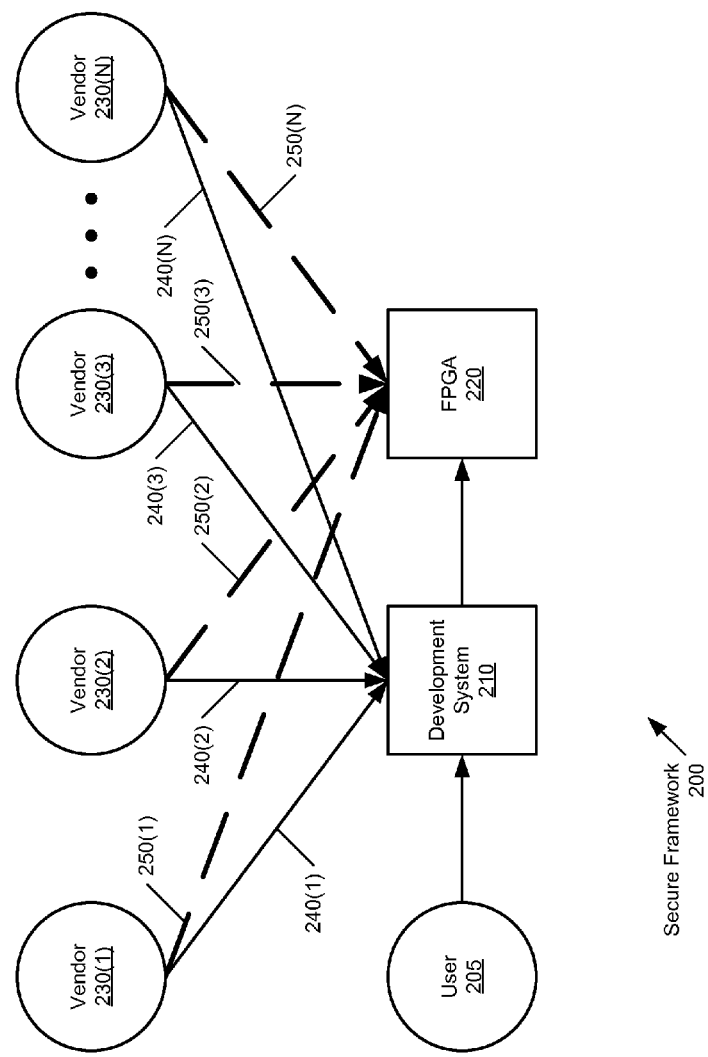
FIG. 2 is a block diagram illustrating a framework for the delivery and tracking of IP cores.

FIG. 2 is a block diagram illustrating a secure framework 200 according to an embodiment of the present invention. Development system 210 is an example of the design environment depicted in FIG. 1 (design environment 100). A user 205 employs a development system 210 in order to program a target device such as a field-programmable gate array (FPGA) 220 or other programmable logic device (PLD). In secure framework 200, one or more vendors (depicted in FIG. 2 as vendors 230(1)-(N)) provide one or more functional models to development system 210 via a corresponding one of communication channels 240(1)-(N). The functional models provided to development system 210 via communication channels 240(1)-(N) allow development system 210 to perform the optimization, mapping, placement and routing, and bitstream generation necessary to program FPGA 220, yet do not provide development system 210 with the actual IP core for implementation in FPGA 220. Thus, secure framework 200 allows for the separation of an IP core's functional model from its actual implementation.

Moreover, separation of the IP core's functional model from its actual implementation can be maintained through the process of delivering this information to the design environment and target devices separately. Thus, the provision of actual IP core(s) can be performed between vendors 230(1)-(N) and FPGA 220 (or a system including FPGA 220) via communication channels 250(1)-(N). As will be appreciated, communication channels 240(1)-(N) can be separate and distinct communication channels, shared communication channels divided only by destination, a single communication channel, or other such arrangement. This ability to vary the amount of separation employed in the delivery of the actual IP core(s) from other information regarding those IP core(s) allows the architect of such a system to select the simplest delivery method, while maintaining the requisite security. In an alternative embodiment each vendor 230(1) to 230(N) (N is an integer) has his own development system 210 which produces his own proprietary bitstream. The vendors 230(1) to 230(N) encrypt their bitstream using assigned public keys and send their encrypted bitstream to FPGA 220 (with the corresponding private key(s)) via lines 250(1) to 250(N), respectively.

In providing for such separation, development system 210 is able to generate a bitstream that allows FPGA 220 to be programmed with the requisite portions of a given design, save for the IP core(s) in question. Thus, the actual IP core(s) are available only to FPGA 220, and not to development system 210, nor, by extension, user 205 (e.g., a designer using development system 210). Secure framework 200 can also be configured to protect the IP core(s) thus delivered from access by the end-users of FPGA 220, who might attempt to gain access to the IP core(s) stored in a configuration storage unit separate from FPGA 220 (and thus accessible to those parties). This level of protection can be a accomplished by downloading the necessary IP core(s) only when FPGA 220 is initialized (or by maintaining them on-chip, once downloaded thereto), thereby preventing FPGA 220 from storing such information off-chip. At a minimum, such information can be encrypted (or re-encrypted) if it is to be communicated off-chip.

Figure 3:
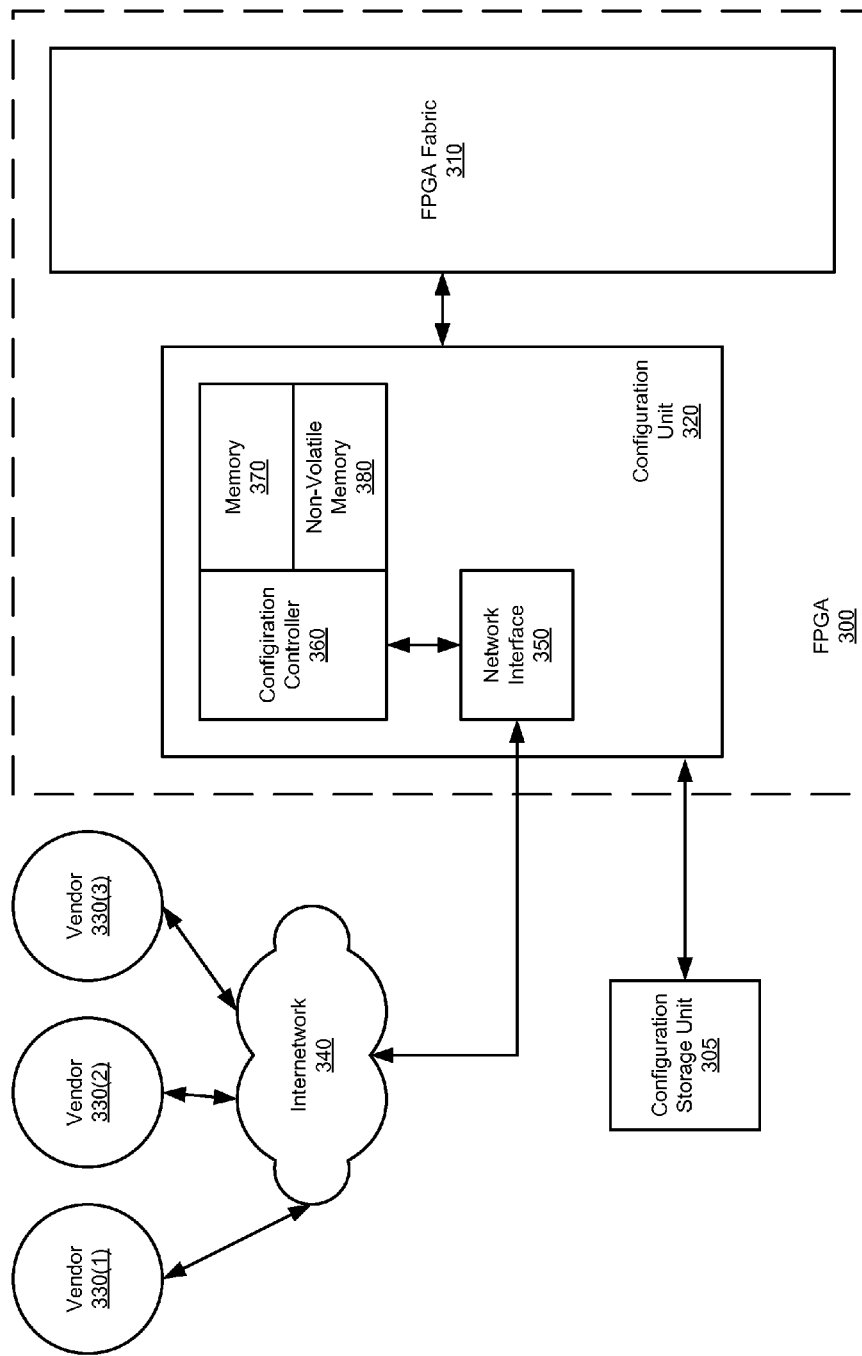
FIG. 3 is a block diagram illustrating a framework for the delivery of IP cores, showing further details of a field-programmable gate array (FPGA).

FIG. 3 is a block diagram illustrating the elements involved in the operation of a PLD according to an embodiment of the present invention (e.g., FPGA 220). In this embodiment, an FPGA 300 communicates with a storage configuration unit 305 in order to access information regarding the configuration of an FPGA fabric 310 of FPGA 300. More specifically, a configuration unit 320 of FPGA 300 accesses configuration information stored in configuration storage unit 305 and uses this information to program FPGA fabric 310 for the functionality desired (as indicated by the configuration information stored in configuration storage unit 305).

In certain embodiments, configuration information is stored in configuration storage unit 305, for example a PROM. This configuration information is referred to herein as a skeleton design, so called because the design represented thereby is missing the configuration information for one or more IP cores. In place of such information, the skeleton design contains only gaps, in which the missing IP cores are to be inserted. This operation is also referred to herein as "stitching" the IP core into the skeleton design.

Configuration unit 320, according to an embodiment of the present invention, includes a number of elements that allow FPGA 300 to access information regarding the IP core(s) that are needed to complete the skeleton design (e.g., stored in configuration storage unit 305). Configuration unit 320 communicates with one or more vendors (depicted in FIG. 3 as vendors 330(1)-(3)) via an internetwork 340 (the case where communication channels 240(1)-(N) and 280(1)-(N) employ a single, shared communications channel). Vendors 330(1)-(3) provide the requisite IP core(s) to configuration unit 320, which then inserts those IP core(s) in the design programmed into FPGA fabric 310. As will be appreciated, this may occur prior to the skeleton design being loaded into FPGA fabric 310, during this operation, or after the skeleton design has been programmed into FPGA fabric 310 (e.g., the FPGA is partially reconfigured with the IP Core).

Configuration unit 320 is able to access internetwork 340 (and so vendors 330(1)-(3)) via a network interface 350. Network interface 350 also provides for communications between internetwork 350 and a configuration controller 360. Configuration controller 360 accesses operating software stored in a memory 370, and certain other information that is to be stored within FPGA 300 (depicted in FIG. 3 as a non-volatile memory 380). Non-volatile memory 380 can be used, for example, to store an identifier that is unique to the PLD (in this example, FPGA 300), and can also be used to store an identifier that identifies the PLD family (also referred to herein as a family identifier), among other such possible identification information.

In a preferred embodiment, non-volatile memory 380 is a one-time programmable (OTP) device that is programmed by the manufacturer of FPGA 300. The use of an OTP device, programmed by the PLD manufacturer, is advantageous for a variety of reasons. Chief among them is the fact that the manufacturer (a trusted entity) maintains control over the creation and assignment of identification information. In so doing, the manufacturer also maintains control over the assignment (and creation) of encryption/decryption keys for the thusly-identified PLDs, as a result of the fact that a PLD's identifier and encryption/decryption keys are related to one another. As will be appreciated, such a role can be assumed by any entity acting as a trusted entity within a paradigm of the present invention. Maintaining control over the identification of a PLD is also important in preventing "grey market" sales, as noted earlier, among other such benefits.

Further security can be provided by implementing part or all of configuration unit 320 as an IP core itself. Using such an approach, the portion of configuration unit 320 implemented as an IP core is downloaded, for example, from the PLD manufacturer, from configuration storage unit 305 or from some other trusted source. The IP core is then decrypted, and made available to perform downloading and decryption of IP cores.

The PLD's encryption information (e.g., private key information, symmetric key information and the like) is preferably stored within the PLD in some manner. For example, this key information might include a private key, in the case in which a public/private key encryption system is encrypted. This encryption information (or subsets thereof) can be used for securely communicating with vendors, for decrypting IP cores received from a vendor, authenticating a vendor, decrypting information from encrypted information stored in configuration storage unit 305, as an encryption/decryption unit for FPGA fabric 310 (both for information into and out of the fabric, and as a part of a design implemented in the fabric), and for other such uses.

While in some embodiments, memory 370, non-volatile memory 380 or other memory within FPGA 300 can be used to store the PLD's encryption information, the security of such information can be improved by designing such information into the PLD in question (e.g., using mask-programmable read-only memory (ROM) or the like). This is particularly important in the face of potential reverse-engineering efforts to which such devices might be subjected. For example, if a PLD employing such an approach were to be disassembled, the mask-programmable ROM's programming (e.g., key information) would not be evident from a visual inspection of the device. To this end, additional security can be provided in such situations through the use of a mechanism capable of erasing some or all of the information thus stored, as well as other confidential information.

In one embodiment of the present invention, an IP vendor can create, in conjunction with the use of a "smart" configuration unit such as configuration unit 305, what is in effect an encrypted "partial configuration bitstream" based on an IP core. In the posited embodiment, this partial configuration bitstream is bounded to a specific XxY area, at a specific location, within FPGA fabric 310. Because the partial configuration bitstream is designed to be implemented in a specific section of the FPGA's fabric, a fabric I/O interface template is created that provides the interconnect information needed to "stitch" the partial configuration bitstream into the end-user's skeleton design.

Using a configuration controller such as configuration controller 360, more complex bitstream manipulation is feasible. For example, unrelated routes through the IP core's XxY area of the PLD can be added in order to reduce routing congestion at the system level. Another example is the sparing of bad rows/columns within a PLD. With a configuration controller such as that described herein, and extending the unique part ID to include a map of bad rows and columns in a PLD implementing an embodiment of the present invention, the configuration engine can have the information needed to modify configuration bitstreams, in order to spare bad rows and columns. Thus, IP cores delivered using an embodiment of the present invention can be "spread" to avoid bad columns and/or rows within the PLD.

Figure 4:
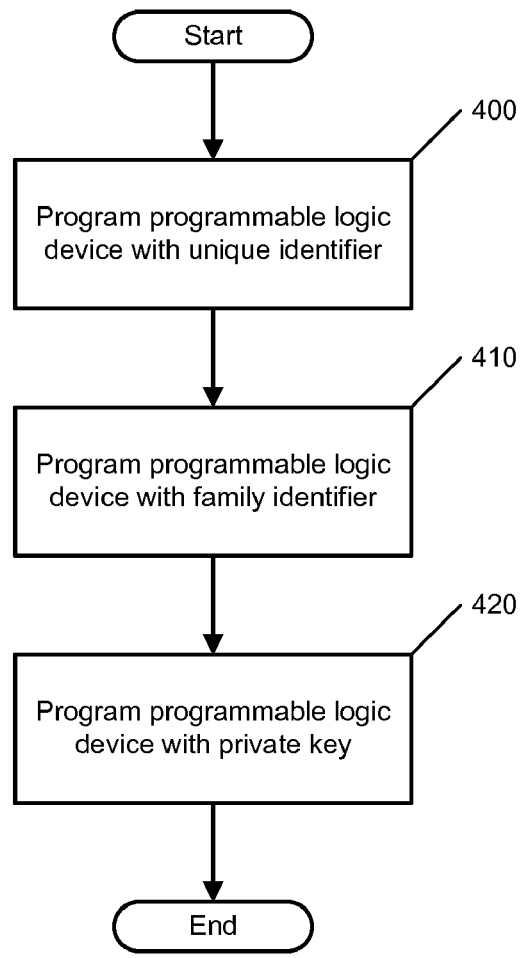
FIG. 4 is a flow diagram illustrating an example of actions performed in programming a programmable logic device (PLD) of an embodiment of the present invention.

FIG. 4 is a flow diagram illustrating an example of a process of programming a PLD such as FPGA 300 with security information, which could be stored, for example, in a non-volatile memory such as non-volatile memory 380. The process begins with the programming of a PLD with a unique identifier (step 400). As noted, this is preferably performed by the PLD's manufacturer, for the aforementioned reasons. This unique identifier can, for example, uniquely identify the PLD among all such PLDs, within a family of PLDs or in some other manner. Optionally, in the case in which the PLD is uniquely identified within a family of PLDs, the PLD is also programmed with a family identifier (step 410). As noted previously, in a secure environment, the PLD is also programmed with encryption/decryption information (e.g., a private key unique to that PLD, in the case where a public/private key encryption technique is employed) (step 420).

As noted, FIG. 4 depicts a flow diagram illustrating a process according to an embodiment of the present invention, as do the other flow diagrams presented herein. It is appreciated that operations discussed herein may consist of directly entered commands by a computer system user or by steps executed by application specific hardware modules or a combination thereof, and may be performed in any convenient and appropriate order. The functionality of steps referred to herein may correspond to the functionality of modules or portions of modules.

The operations referred to herein may be modules or portions of modules (e.g., software, firmware or hardware modules). For example, while the described embodiment includes field-programmable gate arrays, application specific integrated circuits and other such hardware modules, the various example modules may be implemented as software modules and/or include manually entered user commands. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a PLD (e.g., an FPGA), the design of a gate array or full-custom application-specific integrated circuit (ASIC), or the like.

Figure 5:
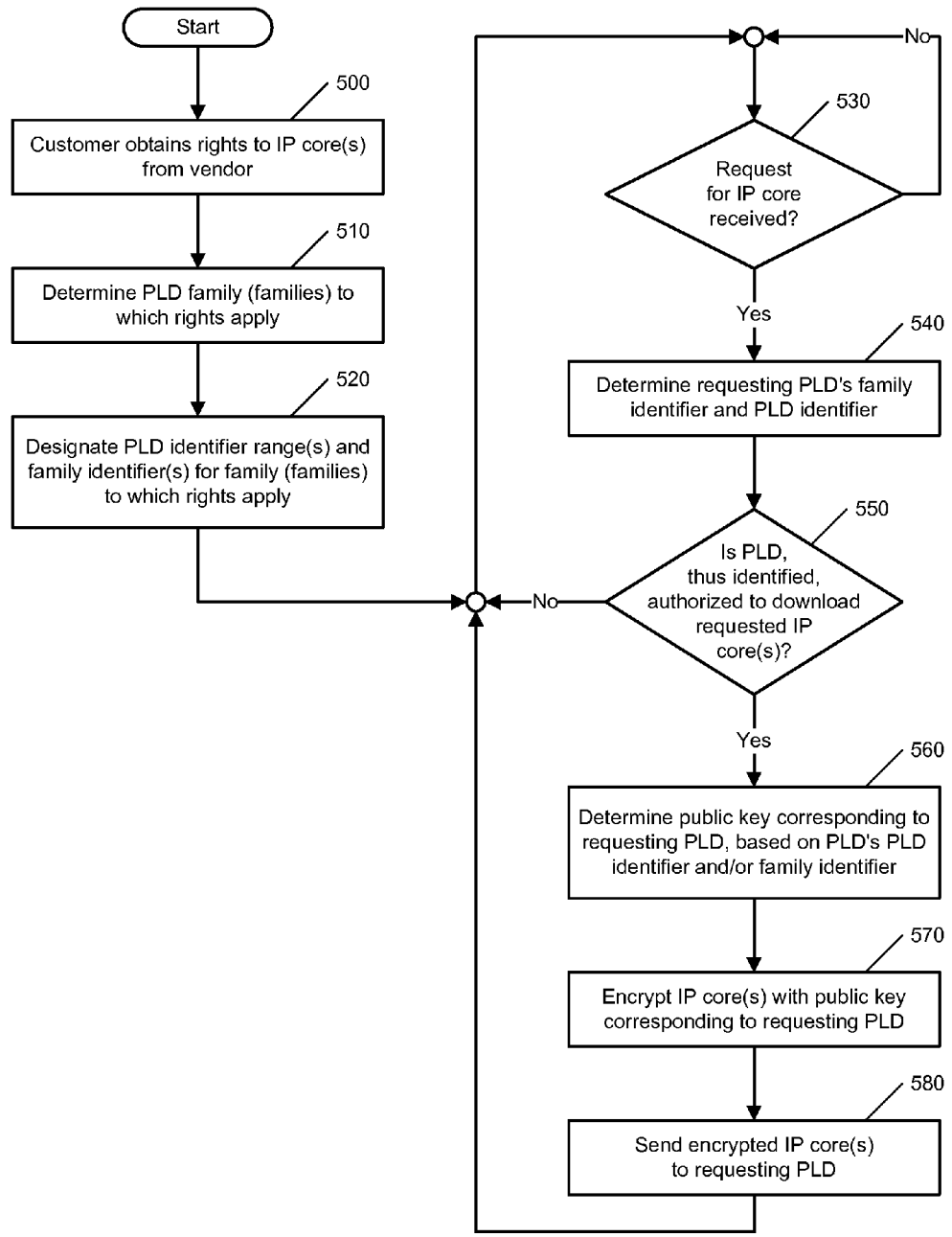
FIG. 5 is a flow diagram illustrating a process of sending an IP core performed by a vendor, in a system according to an embodiment of the present invention, in which authorization is checked by the vendor.

FIG. 5 is a flow diagram illustrating an example of the process of downloading an IP core to a PLD according to an embodiment of the present invention. The process begins with the customer (i.e., the party purchasing the end-product containing the PLD to be programmed) obtaining the appropriate rights to the IP core (or cores) in question, from the vendor of those IP core(s) (step 500). The determination is then made as to which PLD family (or families) to which the customer has obtained rights (step 510). Once this determination is made, one or more ranges of PLD identifiers and family identifiers for the family (or families) to which the rights obtained will apply are designated (step 520). It should be noted that a set of individual identifiers (or set of identifier ranges or other such combination) can be employed in place of a simple range of identifiers.

As will also be appreciated, two options (of several) are to use a PLD identifier that is unique within all PLDs that exist, that the given vendor supports or some other superset of PLDs. In this case, only the PLD identifier is used. Alternatively, a PLD identifier that is only unique guaranteed to be unique within a given PLD family can be used. In such a scenario, a PLD family identifier is needed to uniquely identify the PLD within the superset in question (e.g., all PLDs, all PLDs supported by a given vendor, those PLDs for which a given design can be used, or the like). In an embodiment in which a trusted entity such as the PLD manufacturer programs the unique identification information into the PLD, the ability to control the creation and assignment of such unique identification information, while allowing its ready distribution and use, is advantageous.

As will also be appreciated, the identification of the PLDs authorized to receive the given IP core(s) can be managed by the vendor, the PLD manufacturer or some other trusted entity. The trusted entity provides the unique identification information for the affected PLDs. The vendor(s) can then use this information to vet requests, or provide that information with encrypted IP cores to enable the requesting PLD to make such a determination. As is apparent, the simplest approach is to allow the vendor(s) to perform such management tasks.

Once the PLD identifier range(s) and family identifier(s) have been determined for the rights thus obtained, the PLD (e.g., sold as part of an end-user product) can then be programmed appropriately. In such a scenario, the computer system managing such rights for the vendor awaits the receipt of a request for an IP core (step 530). Once such a request is received, a determination is made as to the requesting PLD's family identifier and PLD identifier (step 540). This information is typically determined from the information provided to the vendor's rights management system, along with the unique identification information received with the request for the IP core.

A determination is then made as to whether the PLD requesting the IP core, having been thus identified, is authorized to download the requested IP core(s) (step 550). If the requesting PLD is not authorized to download the requested IP core(s), the vendor's rights management system returns to waiting for the next IP core request (steps 550 and 530). However, if the requesting PLD thus identified is authorized to download the requested IP core(s), a determination is made as to the manner in which the requested IP core(s) will be delivered to the requesting PLD. For example, in a public/private encryption key scenario, the vendor determines the public key corresponding to the requesting PLD that has been identified (step 560). This determination can be based on any number of identifying characteristics. For example, a public key can be determined based on the requesting PLD's family identifier. Alternatively, the public key can be selected simply using the PLD's unique identifier. Once this determination is made, the requested IP core(s) are encrypted with the public key corresponding to the requesting PLD, as identified previously (step 570). Once the IP core(s) have been encrypted, the vendor sends the encrypted IP core(s) to the requesting PLD (step 580).

It should be noted that, in the foregoing discussion, it is assumed that the PLD (or the hardware employing the PLD) is tasked with contacting the IP vendor. In fact, other alternatives can be readily employed. For example, the end-user of the PLD can contact the IP vendor with the request, and the end-user authorized (as well as authenticated). In such a scenario, the end-user provides the requisite identification information, and a determination made as to whether the given end-user is authorized to cause the PLD thus identified to receive the IP core in question. As can be seen, a variety of alternatives thus present themselves, using various sources of authorization and authentication information, and such alternatives are intended to come within the scope of this disclosure.

Moreover, it will also be appreciated that a "session key" approach can also be employed. A session key can be implemented by providing the functionality necessary for the PLD (or its associated hardware, or the IP vendor) to generate keys on a per-use basis, for example. Thus, each time an IP core is needed by the PLD (or after so many uses of an IP core), the PLD (or IP vendor, hardware, etc.) can be made to generate a new set of keys, one that is transmitted to other entities within the secure system (e.g., the IP vendor, the PLD, the hardware, etc.), and one that is kept by the entity generating the keys (in a public/private key system). The former key, in such a system, would be the public key, and the latter, the private key. This allows for further protection, in that, if a private key is cracked, that key will change (and very likely, before the old key can be used). Alternatively, a symmetric key or other encryption technique can be employed.

Figure 6:
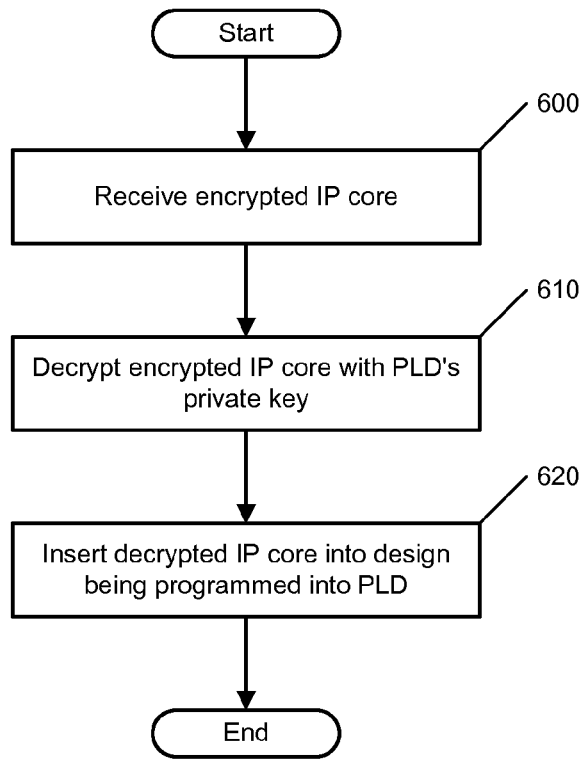
FIG. 6 is a flow diagram illustrating a process of receiving an IP core performed by a PLD, in a system according to an embodiment of the present invention, in which authorization is checked by the vendor.

FIG. 6 is a flow diagram illustrating a process performed at a requesting PLD when receiving an IP core from a vendor performing the process depicted in FIG. 5, or a process comparable thereto, according to an embodiment of the present invention. The process begins with the receipt of the encrypted IP core (step 600). Once received, the encrypted IP core is decrypted with the requesting PLD's private key (step 610). As will be appreciated, the private key used to decrypt the encrypted IP core will be the counterpart of the public key that was used by the vendor to encrypt the IP core.

Next, the decrypted IP core is then inserted into the design being programmed into the requesting PLD (step 620). Thus, the portions of the design that are local to the requesting PLD (referred to herein as a skeleton design) contain "gaps" into which IP cores that are obtained according to an embodiment of the present invention are inserted. This insertion can be performed prior to the programming of the target device, in conjunction with such programming, or after this programming (e.g., the IP core(s) are inserted into an otherwise complete design in the target device's fabric).

Figure 7:
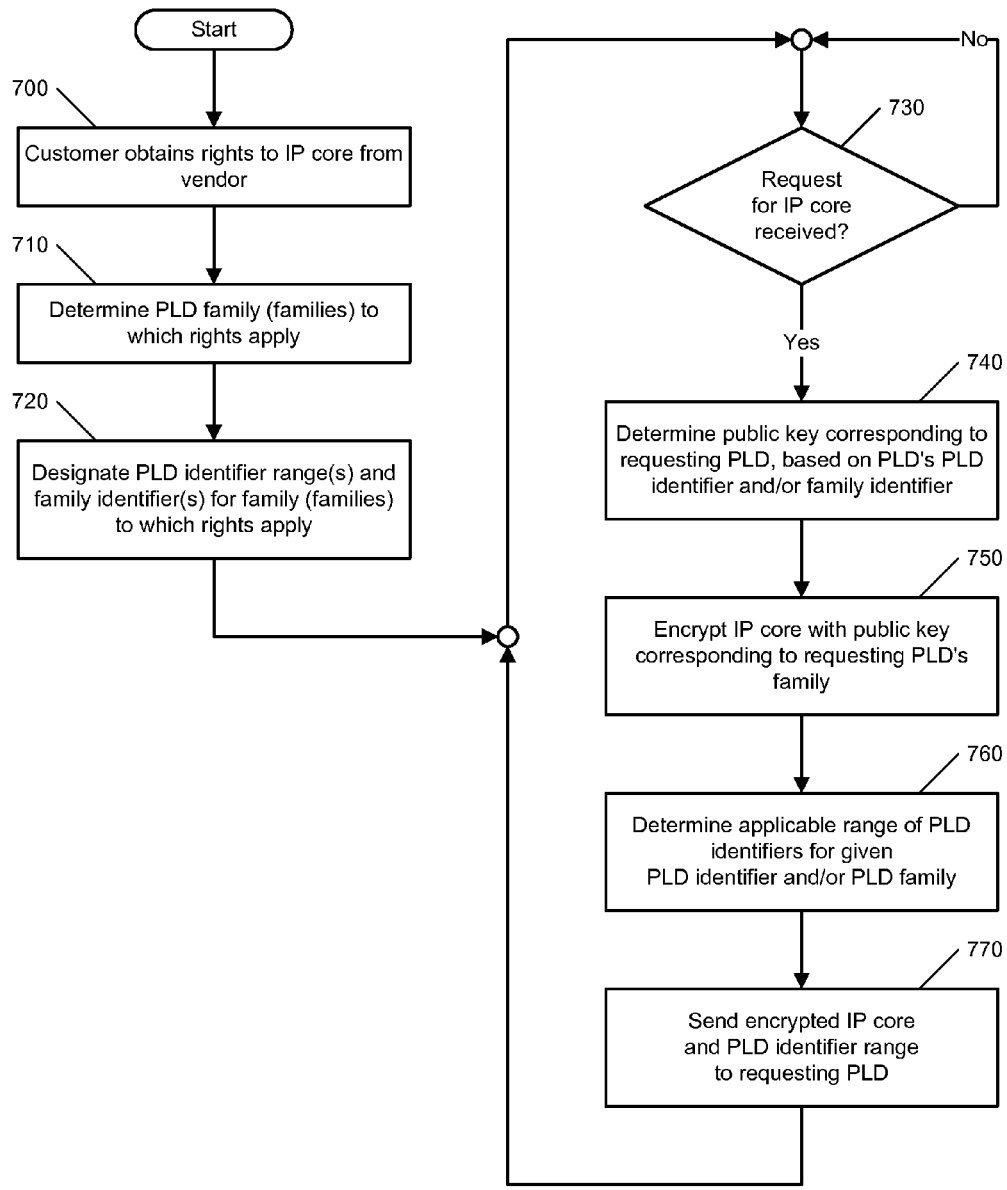
FIG. 7 is a flow diagram illustrating a process of sending an IP core performed by a vendor, in a system according to an embodiment of the present invention, in which authorization is checked by the PLD.

FIG. 7 is a flow diagram illustrating a process performed by a vendor in providing an IP core in a manner according to an embodiment of the present invention. As will be appreciated, the process of FIG. 7 is an alternative to that depicted in FIG. 5. In the process of FIG. 7, then, certain aspects of the authorization process are shifted from the vendor to the requesting PLD.

The process begins with the customer obtaining rights to the desired IP core(s) from the vendor, as before (step 700). The vendor then determines the PLD family (or families) to which the rights thus obtained apply (step 710). As noted, the identification of the PLDs authorized to receive the given IP core(s) can also be managed by the PLD manufacturer or some other trusted entity. The trusted entity provides the unique identification information for the affected PLDs to the appropriate vendors (or the vendors themselves maintain such information). The vendors then use this information to vet requests, or provide such information with encrypted IP cores, in order to enable the requesting PLD to make such a determination.

Once the requisite rights have been obtained and the PLD family (or families) in question have been identified, the vendor designates a range of PLD identifiers and family identifiers for the family (or families) to which the rights will apply (or refers to such information received from a trusted entity) (step 720). This completes the preparations necessary for the vendor to supply customers with one or more IP cores in a manner according to an embodiment of the present invention. As noted, a family-based approach, such as that discussed in connection with FIG. 7, is optional—PLD's can be identified on an individual basis, or in some other appropriate manner.

The vendor then awaits receipt of a request for an IP core (step 730). If no such request is received, the vendor simply continues to wait. Once a request has been received, a determination is made as to the public key that is to be used in encrypting the requested IP core (step 740). This determination is made based on the PLD's family identifier, and/or on the PLD's PLD identifier. Once the proper public key is determined, the vendor encrypts the requested IP core(s) with the public key thus identified (step 750). The applicable range of PLD identifiers for the given PLD family is then determined (step 760), and in so doing, the vendor is determined. As noted, the vendor typically defines, for the PLD family in question, the range of PLD identifiers that are, in fact, authorized to receive the requested IP core(s).

The encrypted IP core(s) and PLD identifier range(s) are then sent to the requesting PLD (step 770). As can be seen, no determination is made by the vendor as to authorization of the requesting PLD to receive the requested IP core(s) in such an embodiment. The information necessary to make this determination is either known or sent to the requesting PLD, which is then able to determine whether or not that PLD is authorized to use the IP core(s) thus received. Such a determination is depicted in connection with the flow diagram of FIG. 8.

Figure 8:
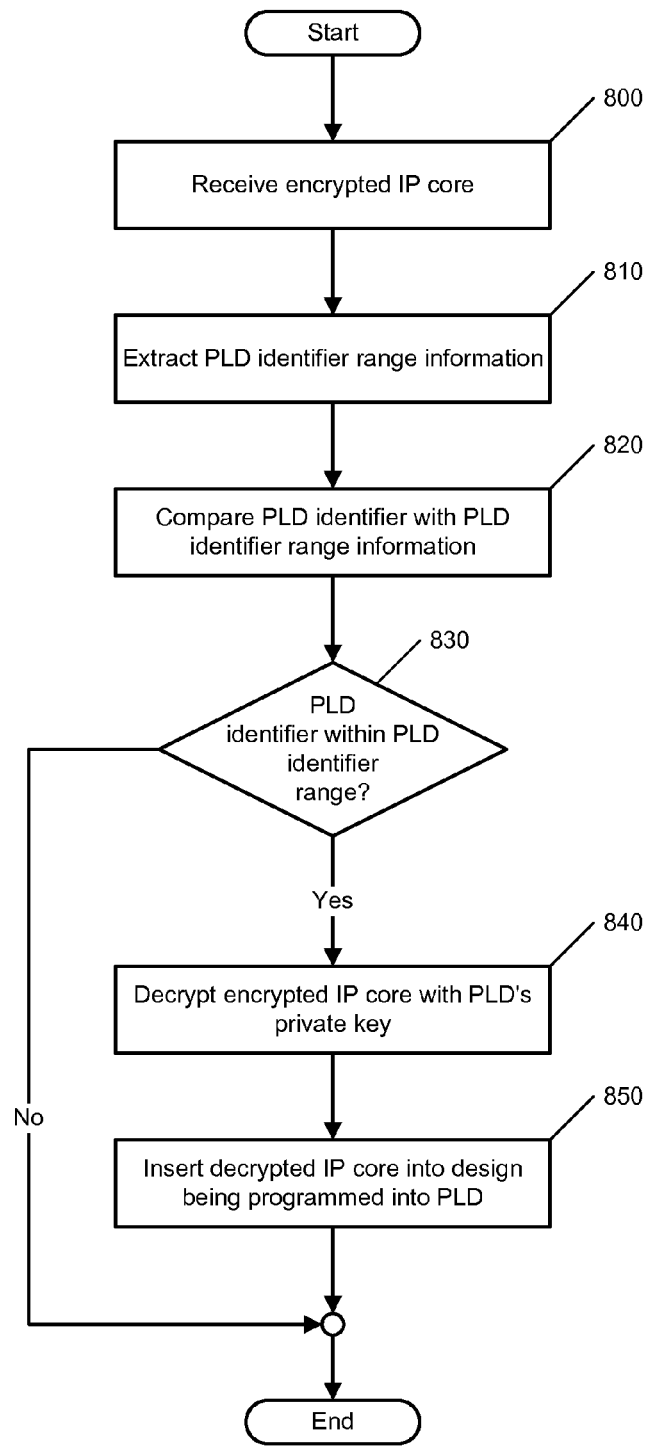
FIG. 8 is a flow diagram illustrating a process of receiving an IP core performed by a PLD, in a system according to an embodiment of the present invention, in which authorization is checked by the PLD.

FIG. 8 is a flow diagram illustrating a process performed at a requesting PLD, according to an embodiment of the present invention, corresponding to the vendor process of FIG. 7. The process begins with the receipt of an encrypted IP core (step 800). The requesting PLD then extracts the PLD identifier range information sent by the vendor, along with the encrypted IP core (step 810). The requesting PLD then compares its PLD identifier with the PLD identifier range information sent by the vendor (step 820). The requesting PLD then makes a determination as to whether its PLD identifier is within the PLD identifier range provided by the vendor (step 830). If this comparison indicates that the requesting PLD's PLD identifier is not within the PLD identifier range provided by the vendor, the process ends, and the IP core is not decrypted. Thus, an authorization failure occurs, and the requesting PLD is unable to use the requested IP core.

However, if the requesting PLD's PLD identifier is within the PLD identifier range provided by the vendor, the requesting PLD is authorized to receive the IP core, and so decrypts the encrypted IP core with the requesting PLD's private key corresponding to the public key used by the vendor to encrypt the IP core (step 840). Next, the decrypted IP core is inserted into the skeleton design being programmed into the requesting PLD (step 850). The process then concludes, the IP core having been successfully programmed into the PLD (FPGA).

It will be appreciated that the techniques according to an embodiment of the present invention discussed in connection with FIGS. 5 and 6, and FIGS. 7 and 8, can provide different benefits, which may affect the decision as to which approach is most desirable in a given situation. In the former case, with regard to FIGS. 5 and 6, the IP vendor simply does not send the requested IP core if the requestor (e.g., the manufacturer, end-user, PLD or other entity) is not authorized. In this scenario, the IP vendor ultimately maintains control over the IP core. It also allows the selection of IP cores that can be implemented in the PLDs used by a given manufacturer, to change over time, as the manufacturer's needs change.

However, in the case in which authorization is performed by the PLD (or system receiving the IP core), it is reasonable to expect that a given PLD (or system) will never be able to successfully implement a design that includes an IP core which the given PLD is not authorized to employ (notwithstanding disassembly, reverse engineering and the like, which would be an arduous undertaking). This means that, practically, such a PLD could not be used surreptitiously, regardless of the system in which the PLD is included.

As will therefore be appreciated, the techniques discussed in connection with FIGS. 5, 6, 7 and 8 can be combined to maximize the IP core's security. In that case, authorization is verified by both the IP vendor and the PLD (or system receiving the IP core). Such an approach is, of course, more complex than either of the aforementioned techniques taken alone.

Figure 9:
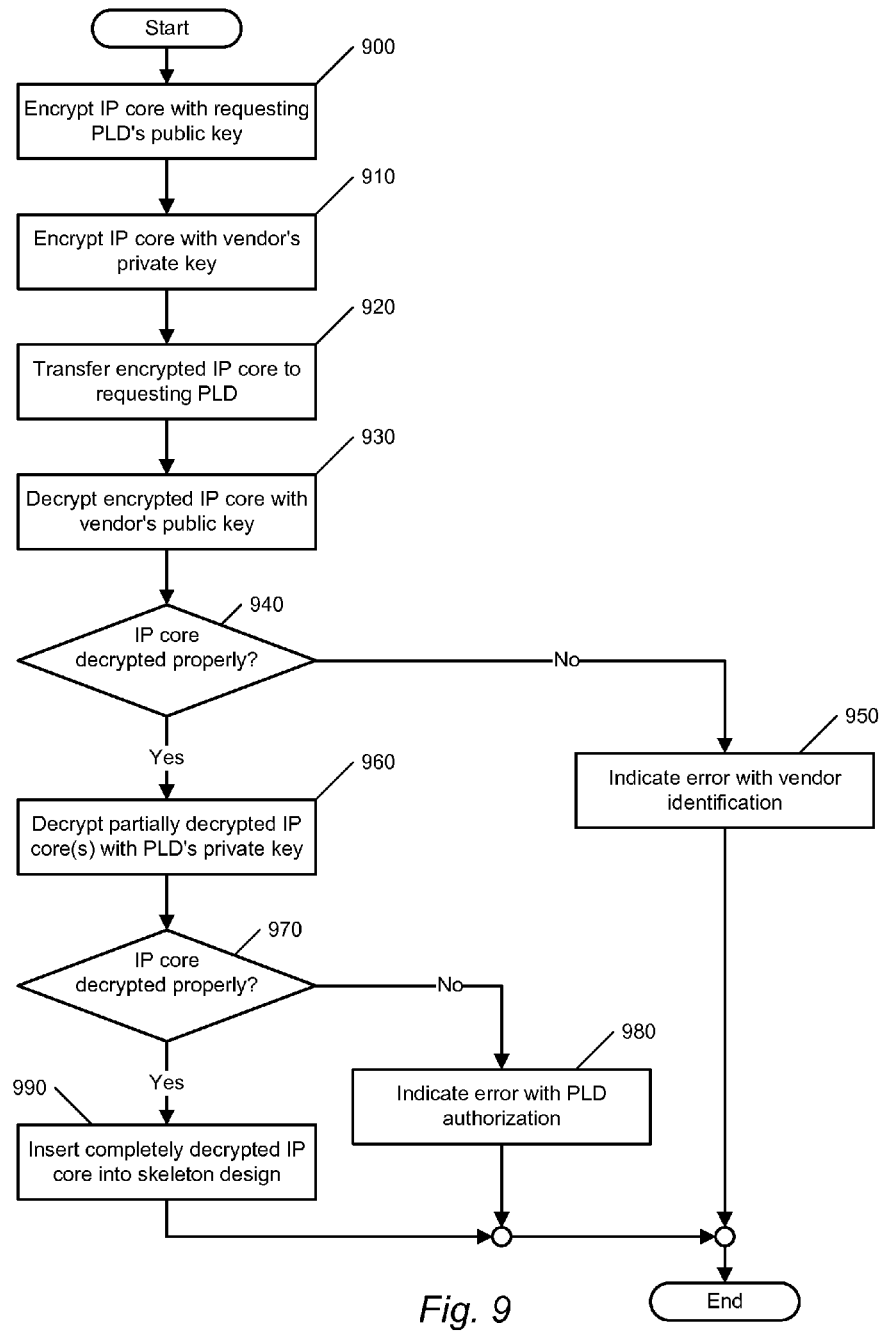
FIG. 9 is a flow diagram illustrating a process of transferring an IP core from a vendor to a PLD, in a system according to an embodiment of the present invention, in which the vendor is authenticated using double public-key encryption.

FIG. 9 is a flow diagram of a process according to an embodiment of the present invention that provides not only for authorization, but also for authentication of the entities involved in the transaction of requesting and receiving an IP core. As will be appreciate, the steps of authorization depicted in FIGS. 5, 6, 7, and 8 are not shown in the flow diagram of FIG. 9. This is both for the sake of simplicity in presentation, and because either of the previously depicted authorization schemes (or other authorization schemes) may be employed along with authentication scheme depicted in FIG. 9.

The process begins with the encryption of the requested IP core with the requesting PLD's public key (step 900). Next, the requested IP core is encrypted with the vendor's private key (step 910). The now-twice-encrypted IP core is then communicated from the vendor to the requesting PLD (step 920). The requesting PLD, having received the encrypted IP core, now decrypts the encrypted IP core with the vendor's public key (step 930). As will be appreciated, the vendor's public key can be obtained by a requesting PLD in any number of ways, including receiving the vendor's public key from a public key server, the manufacturer of the PLD, or some other appropriate source.

A determination is then made as to whether the IP core has been decrypted properly using the vendor's public key (step 940). If the IP core has not been decrypted properly, an error having to do with the vendor's identification is thus indicated (step 950). However, if the vendor's public key has properly decrypted the IP core, the IP core is then decrypted with the requesting PLD's private key (step 960). As will be appreciated, the requesting PLD's private key is maintained within the requesting PLD for reasons of security and can be stored, for example, in a memory structure that can only be read, such as a read-only memory (ROM) like structure. For example, non-volatile memory 380 of FIG. 3 may be a memory that is not changeable, e.g., the private key is diffused into silicon, and cannot be changed. Note that the unique ID may be non-volatile memory such as an OTP efuse. A determination is then made as to whether the IP core has been properly decrypted using the requesting PLD's private key (step 970). As before, if the IP core is not properly decrypted using the PLD's private key, a PLD authorization error is indicated (step 980). If the IP core is properly decrypted using the requesting PLD's private key, the completely decrypted IP core is then inserted into the design being programmed into the requesting PLD (step 990).

Figure 10:
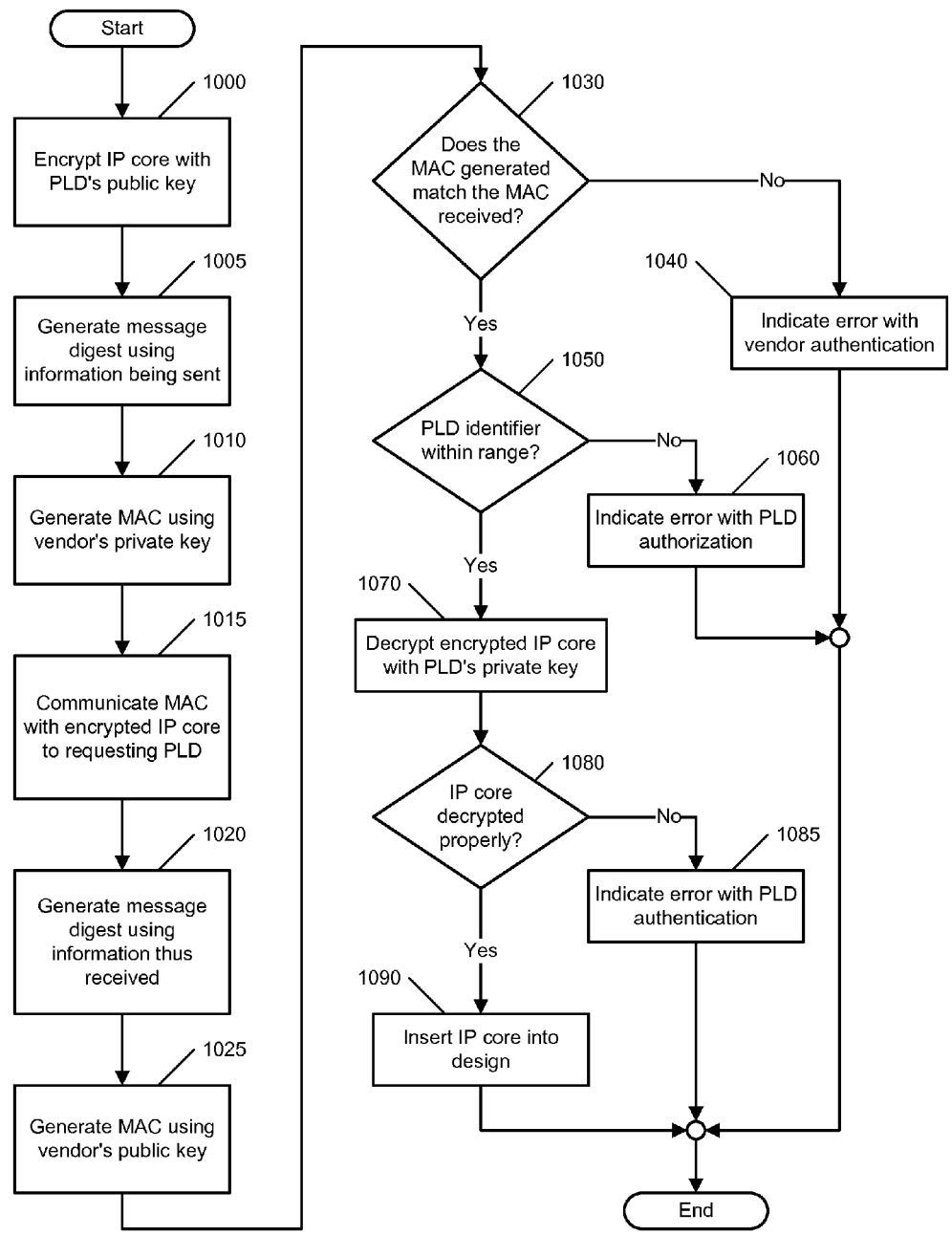
FIG. 10 is a flow diagram illustrating a process of transferring an IP core from a vendor to a PLD, in a system according to an embodiment of the present invention, in which the vendor is authenticated using a message authentication code technique such as a digital signature.

FIG. 10 is a flow diagram illustrating an alternative method for authorization and authentication in the transfer of an IP core from a vendor to a requesting PLD according to an embodiment of the present invention. In this approach, a message authentication code (MAC) is employed to authenticate the source of the IP core (e.g., the vendor providing the IP core). The process begins, as before, with the encryption of the requested IP core using the requesting PLD's public key (step 1000). Next, a message digest is generated using the information to be sent to the requesting PLD (i.e., in part, the encrypted IP core) (step 1005). A message authentication code (MAC) is then generated using the vendor's private key (step 1010). Thus, in the previous two steps, a message digest is created (e.g., using a hash function, in order to hash down the information to a manageable size), and then this message digest is encrypted using the vendor's private key, in order to generate the MAC in question.

Once a MAC is generated, the MAC is communicated to the requesting PLD, along with the encrypted IP core (step 1015). Once the MAC and encrypted IP core is received by the requesting PLD, the requesting PLD generates a message digest using the information thus received from the vendor (step 1020). Next, a MAC is generated by encrypting the message digest using the vendor's public key (step 1025).

As will be appreciated, the process performed by the vendor in generating the MAC received with the encrypted IP core is paralleled, to a degree, by the process of generating a MAC performed by the requesting PLD on the information thus received. For example, the same hash function (or a hash function capable of generating the same message digest) is used by the vendor and by the requesting PLD. On the vendor's side, this message digest is encrypted using the vendor's private key; on the requesting PLD's side, this message digest is encrypted using the vendor's public key. Thus, if the information on which these operations are performed is the same (e.g., information representing the encrypted IP core), and the public key used to encrypt the message digest corresponds to the private key used to encrypt the message digest, the resulting message authentication code generated by the vendor and by the requesting PLD will match one another. In so doing, the vendor is authenticated by the fact that (at least in theory) the vendor is the only entity with access to the vendor's private key. A determination to this effect is made, in which the MAC thus generated is compared with the MAC received with the encrypted IP core (step 1030). If the MAC generated by the requesting PLD does not match the MAC received with the IP core, a vendor authentication error is indicated (step 1040), and the process concludes.

However, if the MAC generated by the requesting PLD matches the MAC received with the encrypted IP core, a determination is then made as to whether the requesting PLD is authorized to receive the requested IP core. In the embodiment depicted in FIG. 10, this determination is made by determining whether the requesting PLD's PLD identifier is within the range of PLD identifiers authorized to receive the requested IP core (as indicated by the PLD identifier range information received with the encrypted IP core) (step 1050). As noted earlier, the use of families is not mandatory, but does help to better organize the rights obtained by the manufacturer. If the requesting PLD is not authorized to receive the IP core (i.e., the requesting PLD's PLD identifier is not within the PLD identifier range received with the IP core), a PLD authorization error is indicated (step 1060). As will be appreciated, these operations are best performed within the requesting PLD, to minimize the opportunity for the process, subversion via an outside party's access to such communications and processes.

If the requesting PLD's PLD identifier is within the PLD identifier range accompanying the encrypted IP core, the requesting PLD decrypts the encrypted IP core with the requesting PLD's private key (step 1070). At this juncture, it is possible to authenticate the requesting PLD, and in so doing, complete authentication of both the vendor and the requesting PLD. Thus, a determination is made as to whether the encrypted IP core has been properly decrypted (step 1080). If the IP core has not been properly decrypted, this indicates that the requesting PLD's private key does not correspond to the PLD's public key used to encrypt the IP core. If such is the case, a PLD authentication error is indicated (step 1085), and the process comes to and end.

In either of the previous two cases in which an error occurs, the process' coming to an end infers that the IP core is not inserted into the skeleton design being programmed into the requested PLD because the IP core is not yet successfully decrypted. In fact, until the authorization and authentication of the requesting PLD is confirmed, the encrypted IP core remains encrypted, thereby maintaining protection of the IP core until such time as the requesting PLD can confirm that it is appropriate for the requesting PLD to have access to an unencrypted version of the IP core. Once the requesting PLD is authorized and authenticated, the IP core (now successfully decrypted), is inserted into the skeleton design being programmed into the requesting PLD (step 1090).

In another embodiment the authentication of the sender, e.g., vendor, similar to using a MAC can be done using a digital signature (see DIGITAL SIGNATURE STANDARD (DSS), Federal Information Processing Standards Publication 186-2, published by the U.S. Government on Jan. 27, 2000, which is incorporated by reference).

Although the present invention has been described with respect to a specific preferred embodiment thereof, various changes and modifications will be suggested to one skilled in the art in light of the present disclosure, and it is intended that the present invention encompass such changes and modifications that fall within the scope of the appended claims.

What is claimed is:

1. A method of protecting design information, comprising:
   communicating requests for respective IP cores from an integrated circuit device to a plurality of vendors, each request including identification information;
   receiving respective identifier ranges from the vendors by the integrated circuit device, each identifier range including a plurality of unique device identifiers identifying a plurality of integrated circuit devices that are allowed to receive the respective IP core;
   for each identifier range, evaluating by the integrated circuit device, whether or not a unique device identifier that is stored on the integrated circuit device is within the respective identifier range; and
   in response to the unique device identifier that is stored on the integrated circuit device being within the respective identifier ranges:
      programming a skeleton design into the integrated circuit device, the skeleton design containing gaps for the respective IP cores; and
      programming the respective IP cores into the integrated circuit device.

2. The method of claim 1, further comprising:
   determining by each of the vendors, whether or not the integrated circuit device is authorized to receive the respective IP core; and
   providing the respective IP core to the integrated circuit device by each vendor, in response to determining that the integrated circuit device is authorized to receive the IP core.

3. The method of claim 2, further comprising:
   identifying by each of the vendors a respective encryption key with which to encrypt the respective IP core, in response to the integrated circuit device being authorized to receive the respective IP core.

4. The method of claim 3, wherein the respective encryption key is a public key corresponding to an integrated circuit family, and the integrated circuit device belongs to an integrated circuit family.

5. The method of claim 3, further comprising:
   in response to the integrated circuit device being authorized to receive the respective IP core,
      generating a respective encrypted IP core by encrypting the respective IP core using the respective encryption key, and
      providing the respective encrypted IP core to the integrated circuit device.

6. The method of claim 5, further comprising:
   receiving the respective encrypted IP core at the integrated circuit device;
   recovering the respective IP core by decrypting the respective encrypted IP core.

7. The method of claim 1, wherein the authorization information further comprises an integrated circuit family identifier.

8. The method of claim 1, wherein the identification information comprises an integrated circuit local family identifier.

9. The method of claim 1, wherein the identification information comprises an integrated circuit identifier.

10. A system, comprising:
    a computer system;
    an integrated circuit device coupled to the computer system;
    wherein the computer system is configured to perform operations including:
       receiving requests for a plurality of IP cores from the integrated circuit device, the request including identification information;
       determining respective identifier ranges in response to the identification information from the receiving step, each identifier range including a plurality of unique device identifiers identifying a plurality of integrated circuit devices that are allowed to receive a respective one of the IP cores; and
       downloading the respective identifier ranges to the integrated circuit device;
    wherein the integrated circuit device is configured to perform the operations including:
       for each identifier range, evaluating whether or not a unique device identifier that is stored on the integrated circuit device is within the identifier range; and
       in response to the unique device identifier that is stored on the integrated circuit device being within the respective identifier ranges:
          programming a skeleton design into the integrated circuit device, the skeleton design containing gaps for the IP cores; and
          programming the IP cores into the integrated circuit device.

11. The system of claim 10, wherein the computer system is further configured to:
    determine whether or not the integrated circuit device is authorized to receive the IP cores; and
    provide the IP cores to the integrated circuit device in response to determining that the integrated circuit device is authorized to receive the IP cores.

12. The system of claim 10, wherein the computer system is further configured to identify respective encryption keys with which to encrypt the IP cores in response to the integrated circuit device being authorized to receive the IP cores.

13. The system of claim 12, wherein the computer system is further configured to perform the operations including:
    in response to the integrated circuit device being authorized to receive the IP cores, generating respective encrypted IP cores by encrypting the IP cores using the respective encryption keys, and
    providing the respective encrypted IP cores to said requestor.

14. The system of claim 13, wherein the integrated circuit device is further configured to perform the operations including:
    receiving the encrypted IP core; and
    decrypting the encrypted IP core.

15. The system of claim 12, wherein:
the computer system is further configured with a plurality of public keys from a plurality of public/private key pairs, and the integrated circuit device is further configured with private keys of the plurality of public/private key pairs;
the computer system is further configured to encrypt one of the IP cores using a first public key of the plurality of public/private key pairs, and the first public key has unrestricted access;
the integrated circuit device is further configured to decrypt the encrypted one of the IP cores using a first private key of the plurality of public/private key pairs associated with the first public key; and
a second public key of the plurality of public/private key pairs has restricted access.

16. The system of claim 15, wherein the unrestricted access comprises general public access to the first public key and the restricted access comprises access to the second public key by only selected users.

17. The system of claim 10, wherein the identification information includes the unique device identifier.

18. The system of claim 10, wherein the integrated circuit device includes programmable logic.

19. The system of claim 10, wherein the integrated circuit device comprises a field programmable gate array.

* * * * *